Figure 1:
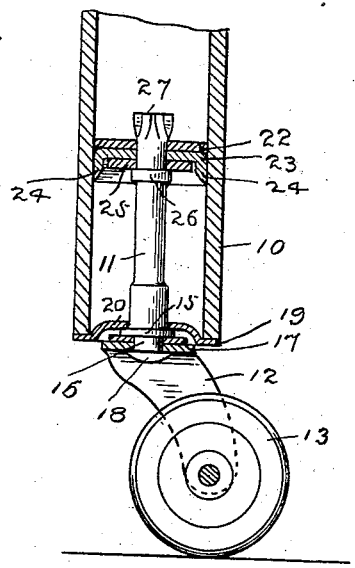

H. A. PALMER.
DETACHABLE CASTER FOR METAL BEDSTEADS.
APPLICATION FILED JAN. 28, 1909.

918,082.

Patented Apr. 13, 1909.

Witnesses:
H. A. Lamb.
S. W. Atherton.

Inventor
Harry A. Palmer
By Attorney
A. M. Wooster

UNITED STATES PATENT OFFICE.

HARRY A. PALMER, OF MERIDEN, CONNECTICUT, ASSIGNOR TO FOSTER, MERRIAM AND COMPANY, OF MERIDEN, CONNECTICUT, A CORPORATION OF CONNECTICUT.

DETACHABLE CASTER FOR METAL BEDSTEADS.

No. 918,082.     Specification of Letters Patent.     Patented April 13, 1909.

Application filed January 28, 1909. Serial No. 474,697.

*To all whom it may concern:*

Be it known that I, HARRY A. PALMER, a citizen of the United States, residing at Meriden, county of New Haven, State of Connecticut, have invented a new and useful Detachable Caster for Metal Bedsteads, of which the following is a specification.

This invention has for its object to provide a detachable caster for metal bedsteads which shall be simple and inexpensive to produce, practically indestructible and which will turn freely in use. It has been a serious objection to casters of this type heretofore produced and especially to sheet metal casters that they quickly twist out of shape so that the pintles will not turn in the sockets and the casters are thus rendered worse than useless as they tear carpets and rugs and ruin hardwood floors.

My present invention enables me to produce a relatively high grade caster at a very low price, that will remain firmly in place in the leg, will stand up for practically an unlimited length of time under the roughest kind of hard usage and will still turn freely and not injure carpets, rugs or hardwood floors.

With these and other objects in view I have devised the simple and novel caster which I will now describe, referring to the accompanying drawing forming a part of this specification and using reference characters to indicate the several parts.

Figure 2:
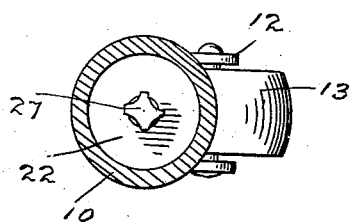

Figure 1 is a longitudinal sectional view of the lower end of the leg of a metal bedstead and my novel caster, showing the caster in place as in use; and Fig. 2 is a plan view of the caster detached.

10 denotes the leg of a metal bedstead which is simply a metal tube, 11 the pintle of my novel caster, 12 the horn and 13 the wheel. The wheel may be of any suitable material as wood, glass or metal, or metal covered with felt or rubber. The horn is of ordinary construction and may be either made of sheet metal or cast. The pintle is provided near its lower end with a bearing head 15. Below the bearing head is a stud 16 which passes through a strengthening washer 17 and through the horn between the arms thereof and is headed down against the horn as at 18, the horn and washer being tightly locked between the heading and the bearing head.

19 denotes a cupped bearing disk which corresponds in diameter with the external diameter of the leg and rests against the lower end thereof, the cup, specifically indicated by 20, just fitting within the leg and locking the parts against lateral displacement in use. The bearing head and the strengthening washer are shown as received within the cup, the entire weight being upon the bearing head upon which the cupped bearing disk rests. The bearing disk is provided with a central hole through which the pintle passes, the pintle fitting the hole closely but turning freely therein. The upper end of the pintle is retained against lateral displacement by means of a supporting disk 22 having a central hole through which the pintle passes. This disk just fits the inner diameter of the leg and the pintle fits the central hole closely but turns freely therein. Below disk 22 is a flexible washer 23, preferably of leather, having a central hole through which the pintle passes and a flange 24 depending therefrom which engages the inner wall of the leg closely. The flexible washer rests upon a disk 25 also having a central hole through which the pintle passes. This disk retains the flexible washer in place and prevents buckling, the flange of the washer lying between the edge of the disk and the inner wall of the leg.

It should be understood that the pintle turns freely in the central holes in disk 25, the flexible washer and the supporting disk. The two disks and the flexible washer are retained in place on the pintle by means of a circular shoulder 26 on the pintle which may be formed by upsetting the metal of the pintle and by heading or upsetting the upper end of the pintle as at 27, the heading engaging the supporting disk when the leg is raised and preventing the pintle from dropping down.

The operation will be readily understood from the drawing. There are no detachable parts and the entire caster is attached and detached together. In putting the caster together the pintle is first attached to the horn, as already described, then the cupped bearing disk is dropped to place, the central hole in said disk being large enough to pass over shoulder 26 and fitting the lower end of the pintle as closely as will permit free rotation of the pintle. Disk 25 is then dropped down on the pintle until stopped by shoulder 26, then the flexible washer is slipped to place, then the supporting disk is placed over that and finally the end of the pintle is upset or headed to retain the disks and the flexible washer in place thereon. The caster is attached to the leg by forcing the flexible washer in until the cupped bearing disk engages the end of the leg, the cup lying within the leg and just fitting the internal diameter so as to retain the caster against lateral displacement, the supporting disk acting to retain the upper end of the pintle in central alinement with the leg and to prevent the possibility of lateral displacement. The grip of the flexible washer on the inner wall of the leg is sufficient to retain the caster securely in place but permitting the caster to be readily detached in its entirety by a straight pull downward when the leg is raised. The flexible washer retains its shape permanently as it is supported by disk 25. This I find a great improvement over metallic spring washers which get sprung out of shape and fail to permanently hold the pintle in central alinement with the leg.

Having thus described my invention I claim:

1. A caster for a metal leg comprising a pintle having a bearing head near its lower end, a disk corresponding with the external diameter of the leg through which the pintle passes and which is provided with a cup directly resting upon the bearing head and adapted to pass within the leg and prevent lateral displacement, means for retaining the upper end of the pintle in vertical alinement with the leg and independent means for detachably securing the caster to the leg.

2. A caster for a metal leg comprising a pintle having a bearing head near its lower end, a disk having a cup bearing on said head and adapted to pass within the leg, for the purpose set forth, a supporting disk in which the upper end of the pintle turns and a flexible washer in which the pintle turns and which is adapted to engage the inner wall of the leg to detachably retain the caster in place.

3. A caster for a metal leg comprising a pintle having a bearing head near its lower end, and a shoulder near its upper end, a disk having a cup bearing on the head and adapted to pass within the leg, for the purpose set forth, a flexible washer to engage the inner wall of the leg, for the purpose set forth, a disk intermediate the flexible washer and the shoulder and a supporting disk for the upper end of the pintle, the pintle turning freely in the disks and the washer.

In testimony whereof I affix my signature, in presence of two witnesses.

HARRY A. PALMER.

Witnesses:
   GEO. A. CONVERSE,
   CHAS. S. WILCOX.